(12) United States Patent
Reissman

(10) Patent No.: US 7,620,248 B2
(45) Date of Patent: *Nov. 17, 2009

(54) SYSTEM AND METHOD FOR VALIDATING GRAPHICAL COMPONENTS OF IMAGES

(75) Inventor: Pierre-Jean Reissman, Villefranche sur Mer (FR)

(73) Assignee: Microsoft Corporation, Redmond, WA (US)

( * ) Notice: Subject to any disclaimer, the term of this patent is extended or adjusted under 35 U.S.C. 154(b) by 737 days.

This patent is subject to a terminal disclaimer.

(21) Appl. No.: 10/993,675

(22) Filed: Nov. 19, 2004

(65) Prior Publication Data

US 2006/0110044 A1 May 25, 2006

(51) Int. Cl.
*G06K 9/68* (2006.01)

(52) U.S. Cl. .................. 382/218; 382/141; 382/233; 382/128; 342/159; 345/502; 705/27

(58) Field of Classification Search ............... 382/218, 382/141, 233, 128, 164, 221, 305, 274; 342/159; 345/502; 705/27; 717/135
See application file for complete search history.

(56) References Cited

U.S. PATENT DOCUMENTS

| | | | |
|---|---|---|---|
| 5,390,133 A | 2/1995 | Sohie | |
| 5,550,937 A | 8/1996 | Bell | |
| 5,661,820 A * | 8/1997 | Kegelmeyer, Jr. | 382/226 |
| 5,703,961 A * | 12/1997 | Rogina et al. | 382/154 |
| 5,715,436 A * | 2/1998 | Kawai et al. | 345/505 |
| 5,982,941 A | 11/1999 | Loveridge | |
| 6,008,820 A | 12/1999 | Chauvin | |
| 6,373,983 B1 | 4/2002 | Tsai | |
| 6,385,342 B1 | 5/2002 | De Queiroz | |
| 6,542,626 B1 | 4/2003 | Brouwer | |
| 6,606,407 B1 | 8/2003 | Takahashi | |
| 6,628,708 B1 | 9/2003 | Sampson | |
| 6,650,779 B2 | 11/2003 | Vachtesvanos | |
| 6,677,944 B1 * | 1/2004 | Yamamoto | 345/422 |
| 6,721,461 B1 | 4/2004 | Nichani | |
| 6,736,478 B2 | 5/2004 | Franzke | |
| 6,795,118 B1 | 9/2004 | Cho | |
| 6,820,046 B1 * | 11/2004 | Lamson et al. | 703/14 |
| 6,888,572 B1 * | 5/2005 | Kozlowski | 348/308 |
| 6,888,577 B2 * | 5/2005 | Waki et al. | 348/589 |
| 6,900,882 B2 * | 5/2005 | Iida | 355/77 |
| 7,024,041 B2 | 4/2006 | Sasa | |
| 7,095,098 B2 | 8/2006 | Jarvis | |
| 7,095,908 B2 * | 8/2006 | Jarvis et al. | 382/305 |
| 7,200,251 B2 * | 4/2007 | Joshi et al. | 382/128 |

(Continued)

*Primary Examiner*—Brian Q Le
*Assistant Examiner*—Aklilu K Woldemariam
(74) *Attorney, Agent, or Firm*—Workman Nydegger

(57) ABSTRACT

A system and method for improved validation of images is provided. Validation of any target image may be performed by creating a model of graphical components of a source image or a reference model and comparing the model of graphical components of the source image or reference model with a model of graphical components of the target image in order to detect differences between the graphical components. In one embodiment, a framework may be provided with an analysis engine for building a model of graphical components of a source image to be compared with a model of graphical components of a target image. In another embodiment, a framework may be provided with a synthesis engine for building a model of a synthesized graphical component to be compared with a model of graphical components of a target image.

20 Claims, 8 Drawing Sheets

U.S. PATENT DOCUMENTS

| | | |
|---|---|---|
| 7,302,677 B2 | 11/2007 | Reissman |
| 7,379,618 B2 | 5/2008 | Motomura |
| 2004/0010375 A1* | 1/2004 | Schomacker et al. .......... 702/19 |
| 2004/0066962 A1 | 4/2004 | Sasa |
| 2004/0093283 A1* | 5/2004 | Jarvis et al. ................... 705/27 |
| 2005/0069207 A1* | 3/2005 | Zakrzewski et al. ......... 382/190 |
| 2005/0084154 A1* | 4/2005 | Li et al. ...................... 382/190 |
| 2005/0163359 A1* | 7/2005 | Murao et al. ................ 382/128 |

* cited by examiner

SYSTEM AND METHOD FOR VALIDATING GRAPHICAL COMPONENTS OF IMAGES

CROSS-REFERENCE TO RELATED APPLICATIONS

The present invention is related to the following copending United States Patent Applications filed concurrently herewith, assigned to the assignee of the present invention, and hereby incorporated by reference in their entireties:

"Fuzzy Image Comparator," Ser. No. 10/993,538, filed Nov. 19, 2004;

"System and Method for Validating Graphical Components of Images," Ser. No. 10/993,751, filed Nov. 19, 2007; and "System and Method for Validating Graphical Components of Images by Analysis," Ser. No. 10/993,537, filed Nov. 19, 2004.

FIELD OF THE INVENTION

The invention relates generally to computer systems, and more particularly to an improved system and method for validating graphical components of images.

BACKGROUND OF THE INVENTION

Software development usually requires testers to evaluate the quality of a software product in many ways, including any content such as images incorporated in a software build or generated by execution of a software build. Traditional testing of such images may involve verifying that every pixel of a test candidate image is identical to the corresponding pixel of a master image. A typical validation algorithm may directly compare each pixel of a test candidate image to a corresponding pixel in the master image and then decide to pass or fail the test candidate image based upon the number of direct pixel comparison failures. The problem with this approach is that the comparison may fail from numerous slight differences that may not be visible by human perception or not relevant with respect to the definition of correctness for the comparison.

Another problem with this approach is that it does not account for noise that may be introduced into an image such as by disk drive controllers in accessing the image from persistent storage or by rendering drivers in rendering an image retrieved from storage. Based on the specifics of the system, some other common sources of noise may include rounding errors due to the high precision of the computations, differences in bit representation of the image format, visually detectable artifacts such as salt and pepper noise from spurious pixels, information missing from the image or extraneous information added to the image, and so forth. Additionally, differences in the implementations of graphics hardware and software drivers, including renderers, may create differences in two rendered images. In any of these cases, a direct pixel comparison approach may often fail where noise has been introduced in the image. Moreover, a direct pixel comparison may not allow for selective targeting of part of an image for validation such as a graphical component like a button or control.

What is needed is a more flexible and adjustable system for validating images. Such a system should be able to compensate for noise introduced into an image, allow for adjustable control of the resolution of an image and allow for selective targeting of content for validation based on a subset of the initial properties if needed.

SUMMARY OF THE INVENTION

Briefly, the present invention provides an improved system and method for validating graphical components of images. To this end, the present invention may perform validation of any target image by creating a model of graphical components of a source image or a reference model and comparing the model of graphical components of the source image or reference model with a model of graphical components of the target image in order to detect differences between the graphical components. In one embodiment, a framework may be provided for building a model of graphical components of a source image to be compared with a model of graphical components of a target image. In another embodiment, a framework may be provided for building a model of a synthesized graphical component to be compared with a model of graphical components of a target image.

The system may provide an image validation engine for validating a graphical component against another graphical component, a modeling engine for modeling each graphical component, an image comparator for comparing the graphical components, a media library for capturing events in the system, a user interface for exposing model designers and analysis tools, and a loader for providing components with information for specific tests. The modeling engine may include an analysis engine for creating a model of a graphical component found in an image and may include a synthesis engine for creating a model of a graphical component synthesized using model designers.

The methods provided by the present invention to build a model of graphical components of an image may include preprocessing the image by applying one or more filters to the image and/or by applying a geometrical transform, such as a 2D affine transform, finding a feature forming a graphical component in the image, and creating a model including a node with information describing the modeled feature such as a collection of matrices identifying the shape of the graphical component by projecting them on a unique point of a multidimensional feature space. The method for finding a feature forming a graphical component in an image may include choosing a pixel as a seed for aggregating similar pixels in a neighborhood to identify a graphical component in an image and flood-filling adjacent pixels that are similar to the selected seed. Once an area of the image may be flood-filled that may identify a shape, then integrals on the shape and the color function associated with the shape may be computed for describing the shape.

In general, the system and method may provide a framework that allows flexible matching and resolution control for validating any number of different image types. The framework of the present invention may also allow building a model of a synthesized graphical component that contains only pertinent information to be compared with a graphical component of another image. Advantageously, the model of a synthesized graphical component may be compared against a set of candidate images to find an image with an equivalent graphical component as that defined by the model of a synthesized graphical component. This may allow the present invention to selectively find a defect when validating images in a software build and may also enable content in the images to be validated by the topology of the model of the synthesized graphical component. Other advantages will become apparent from the following detailed description when taken in conjunction with the drawings, in which:

DETAILED DESCRIPTION

Exemplary Operating Environment

Figure 1:
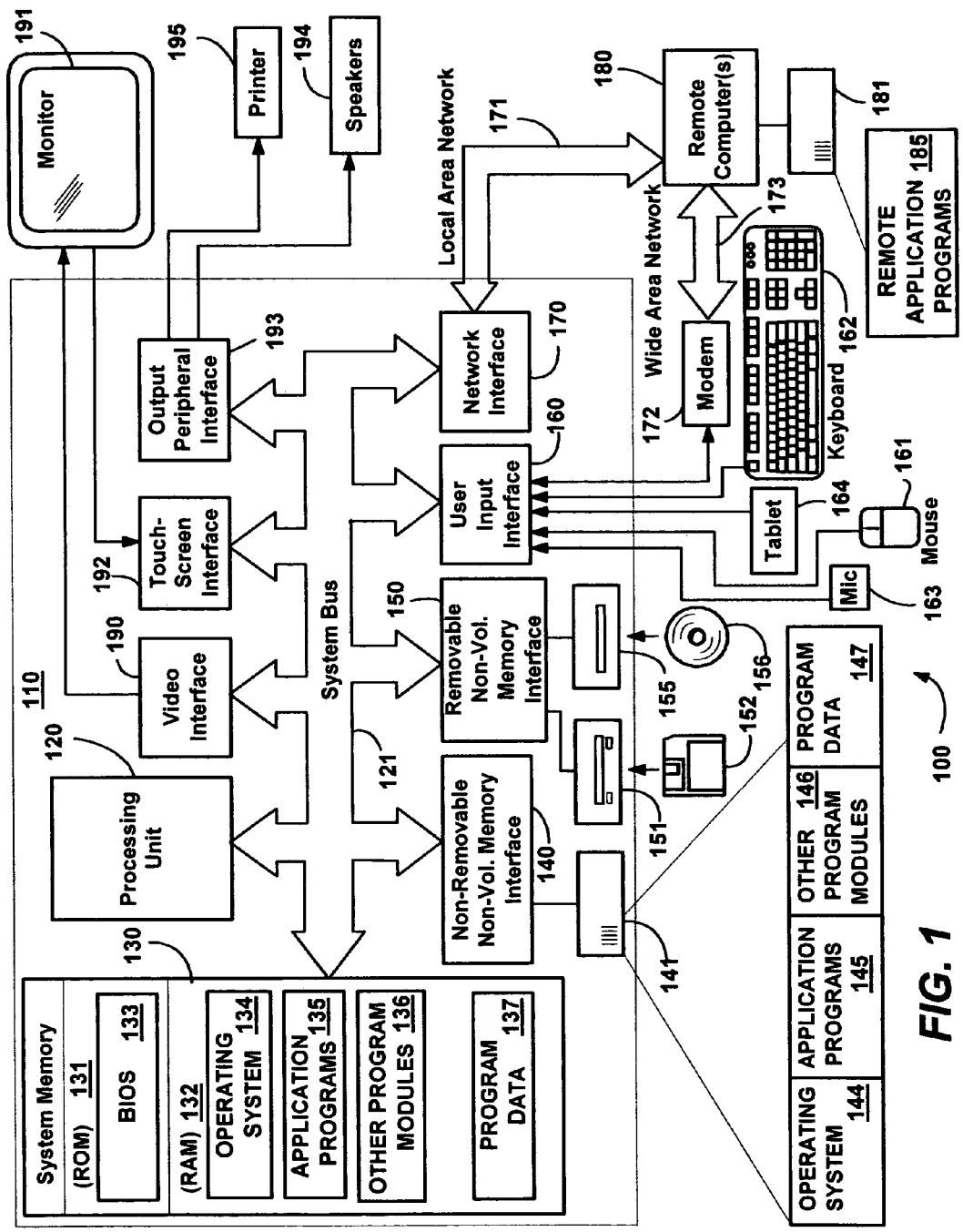
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removeable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 192 or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Validating Graphical Components of Images

The present invention is generally directed towards an improved system and method for validating graphical components of images. More specifically, the invention may validate graphical components of images by providing a framework for building a model of graphical components of an image to be compared with a model of graphical components of another image. The invention may also provide a framework to create a reference model that may contain only pertinent information of a graphical component of an image to be compared with a graphical component of another image. In one embodiment, the system and method may build a reference model from a source image and compare graphical components of the reference model with graphical components in one or more target images. In another embodiment, the system and method may build a model of a synthesized graphical component and compare the model to the content of one or more target images. Thus, the system and method may use the topology of the model to validate content in candidate test images.

Advantageously, the system and method offer flexible matching and resolution control of images for any number of applications. For instance, the present invention may be used to validate images in a software build. The software build may include a set of executable assemblies which may generate images rendered by the software on a screen or display such as a sequence of graphical user interface screens. As defined herein, an image means any visual media such as a video image, a graphical user interface screen, any visual primitives to build a graphical user interface screen including a control, a frame, a window, and so forth. Using the present invention, a reference image may be generated upon test creation and then compared to the images of subsequent builds. Alternatively, a reference model may be built from one or more synthesized graphical components that contains only pertinent information of an image and does not require a build of the system to be defined. As will be understood, the various block diagrams, flowcharts, illustrations and scenarios described herein are only examples, and there are many other scenarios to which the present invention will apply.

Figure 2:
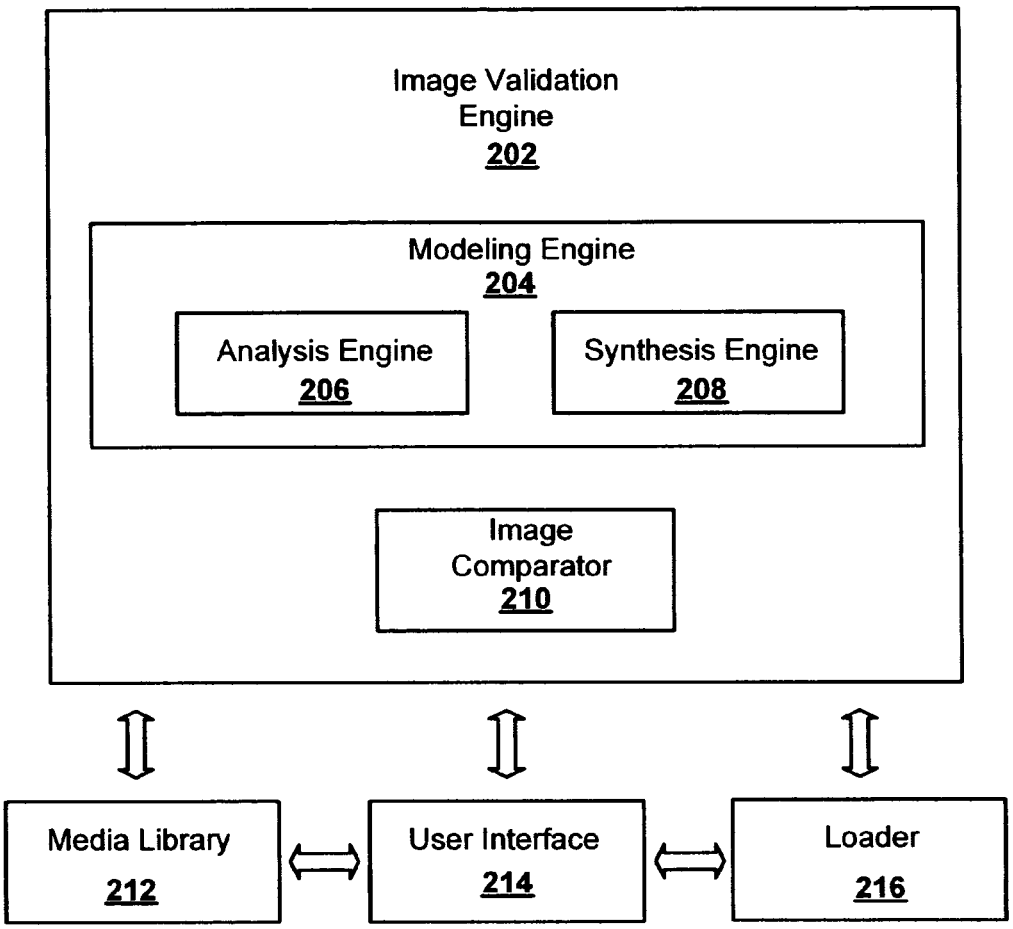
FIG. 2 is a block diagram generally representing an exemplary architecture of system components for validating graphical components of images, in accordance with an aspect of the present invention.

Turning to FIG. 2 of the drawings, there is shown a block diagram generally representing an exemplary architecture of system components for validating graphical components of images. Those skilled in the art will appreciate that the functionality implemented within the blocks illustrated in the diagram may be implemented as separate components or the functionality of several or all of the blocks may be implemented within a single component. For example, the functionality for the user interface 214 may be included in the image validation engine 202, or the functionality of the image comparator 210 may be implemented as a separate component.

The image validation engine 202 may accept any image, including any visual primitive used in a graphical user interface. The image validation engine 202 may be operably coupled to a media library 212, a user interface 214 and a loader 216. The user interface 214 may also be operably coupled to the media library 212 and the loader 216. In general, the image validation engine 202, the media library 212, the user interface 214, and the loader 216 may be any type of executable software code such as a kernel component, an application program, a linked library, an object, and so forth. The image validation engine 202 may include an operably coupled modeling engine 204 and an operably coupled image comparator 210. The modeling engine 204 may include an operably coupled analysis engine 206 and an operably coupled synthesis engine 208. Each of these components may also be any type of executable software code such as a kernel component, an application program, a linked library, an object, or other type of executable software code.

The image validation engine 202 may use either the analysis engine 206 or the synthesis engine 208 to create a model of one or more graphical components for comparison with other graphical components, including those from a target image. The analysis engine 206 may create a model of the graphical components from a source image for comparison with a model of the graphical components from a target image. And the synthesis engine 208 may synthesize a graphical component and create a model, including a semantic model of any content, for comparison with a model of the graphical components of a target image. The image comparator 210 may then compare the modeled graphical components of the images. The media library 212 may capture events in the system and convert them to data structures used by the system. The user interface 214 may expose model designers and analysis tools. The loader 216 may provide components that bind the image validation engine, the media library and test specific information. In one embodiment, the loader may include test independent switches for maximizing coverage of tests.

Figure 3:
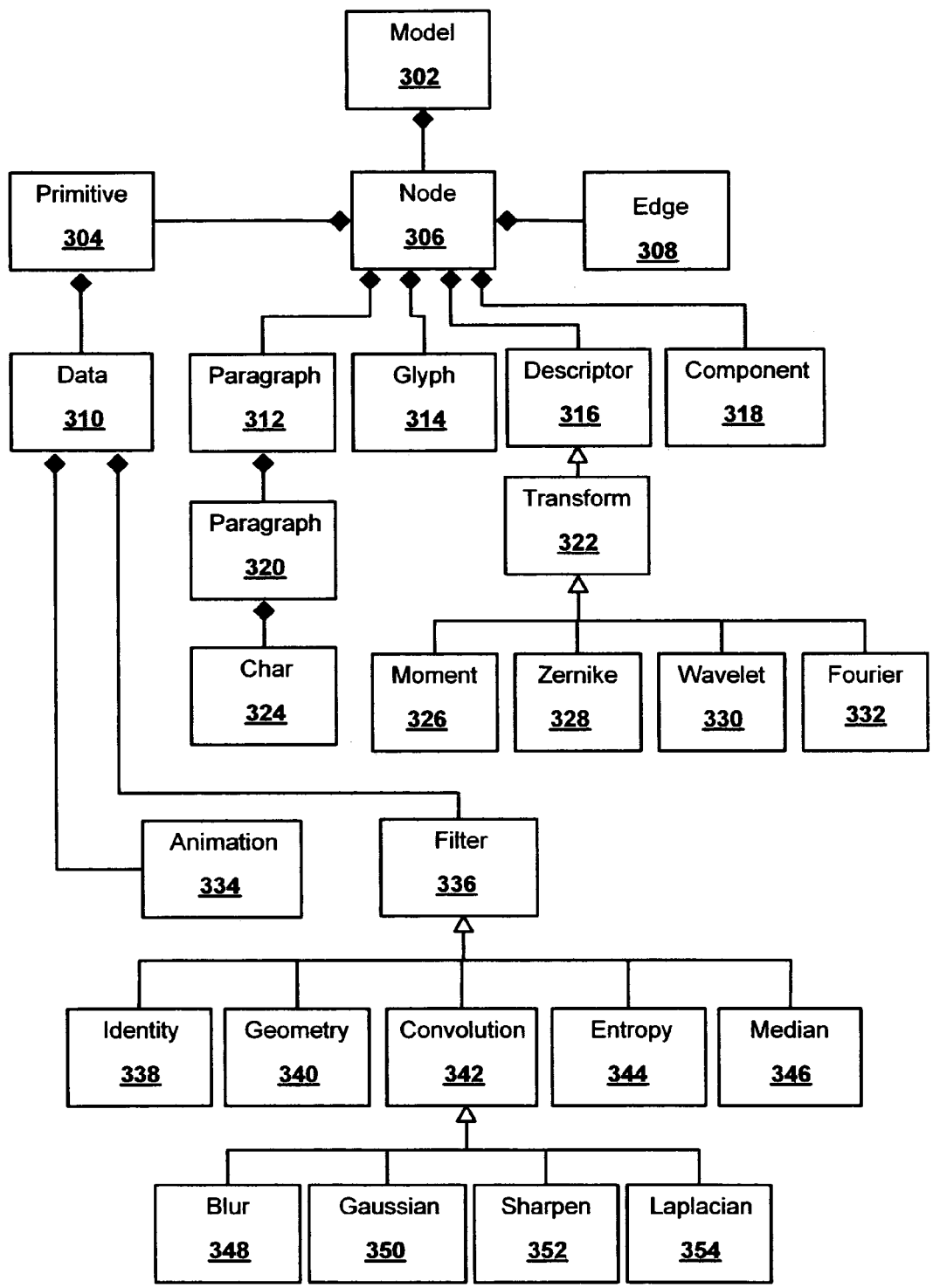
FIG. 3 is an illustration generally representing a model depicting graphical components of an image in one embodiment, in accordance with an aspect of the present invention.

The modeling engine 204 may create a model of a graphical component found in an image or synthesized using model designers. FIG. 3 presents an illustration generally representing a model depicting graphical components of an image in one embodiment of the present invention. For instance, the model 302 may be built the first time that the image validation engine scans an image. In one embodiment, the image validation engine may scan an image generated by a build of a software product. The model 302 may be built as a tree with information about the model 302 stored as the root node. This information may include a name, a description, and other information related to the model. A model may have one or more nodes 306, each of which may aggregate primitives 304 detected within an image. As used herein, a graphical component may mean one or more primitives. A primitive, as used herein, means a homogeneous area of data in an image. Primitives 304 may be homogeneous areas of data transformed by one or more filters applied to the image until a primitive may be detected. The homogeneous area of data may be stored as a child node of the primitive. Each primitive 304 may thus have data 310, such as the value of pixels in the homogeneous area, stored as a child node. Each data 310 node may have an animation node 334 as a child node for storing animation information and a filter node 336 for storing filter information. A set of filters that may be applied to the data may include an identity filter 338, a geometric filter 340, a convolution filter 342, an entropy filter 344, a median filter 346, and other filters known to those skilled in the art which may be applied to the image. The types of convolution filters that may be applied include a blur filter 348, a Gaussian filter 350, a sharpen filter 352, a Laplacian filter 354, or other convolution filter.

In addition to aggregating information about primitives, each node 306 may have a paragraph node 312 as a child node for storing textual information, a glyph node 314 as a child node for storing information about a glyph, and a component node 318 for storing information about a component or other object. A paragraph node 312 may have another paragraph node 320 as a child node or character node 324 as a child node for storing information about a character. A node may have a descriptor node 316 for storing transformation information such as any transform applied to the image. Such transformation information may be stored in a transform node 322 that may be a child of a descriptor node 316. The types of transforms that may be applied to the data may include a moment transformation stored as a moment transform node 326, a Zernike transformation stored as a Zernike transform node 328, a wavelet transformation stored as a wavelet transform node 330, a Fourier transformation stored as a Fourier transform node 332, and other transformation known to those skilled in the art which may be applied to the image.

Each node 306 may be linked through a semantic edge 308 to another node 306. Several nodes that may be related to each other by a semantic edge 308 may form a tree. In one embodiment, the tree formed may resemble the actual component tree that generated the image. Those skilled in the art will appreciate that other data structures and relationships may be used to capture and store a model of an image or graphical components in an image.

Figure 4:
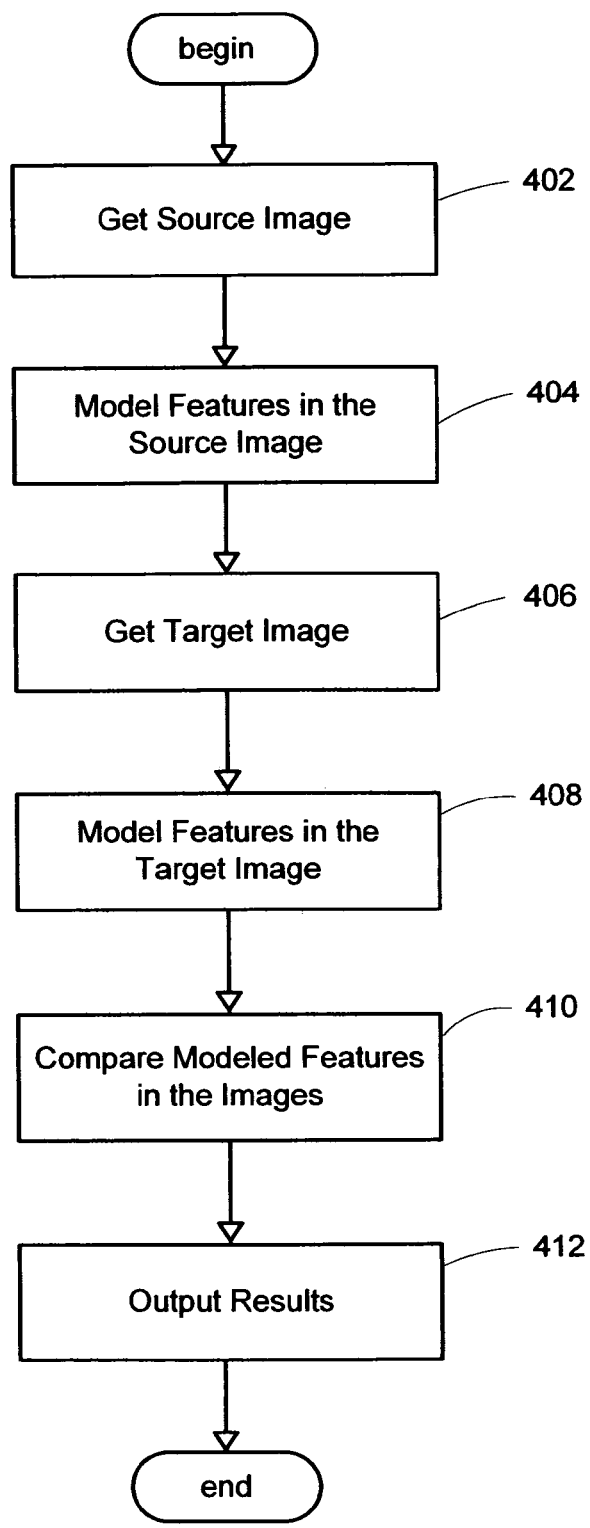
FIG. 4 is a flowchart generally representing one embodiment of the steps undertaken for validating an image by building a model of graphical components of an image to be compared with a model of graphical components of another image, in accordance with an aspect of the present invention.

FIG. 4 presents a flowchart generally representing one embodiment of the steps undertaken for validating an image by building a model of graphical components of an image to be compared with a model of graphical components of another image. Those skilled in the art will appreciate that an implementation, such as analysis engine 206, may choose to perform these steps in a different order for purposes of efficiency or flexibility, while achieving the same effect and without departing from the scope of the present invention. First, a source image may be obtained at step 402 against which a candidate image may be validated. For example, this source image may be scanned from an image generated by a build of a software product and used as a reference image against which a candidate image from a subsequent build of the software product may be validated. Features such as graphical components in the source image may then be modeled at step 404. In one embodiment, a model such as model 302 in FIG. 3 may be created from the source image. A target image may next be obtained at step 406. For instance, the target image may be a test candidate image from a subsequent build of a software product that may be compared to a source image from a previous build of the software product. Features in the target image may then be modeled at step 408. The modeled features in the source image and the target image may then be compared at step 410 and the results of the comparison may be output at step 412. For example, an indication may be output that the images may be determined to be comparable; otherwise, an indication may be output that the images may be determined to have failed to be comparable.

Figure 5:
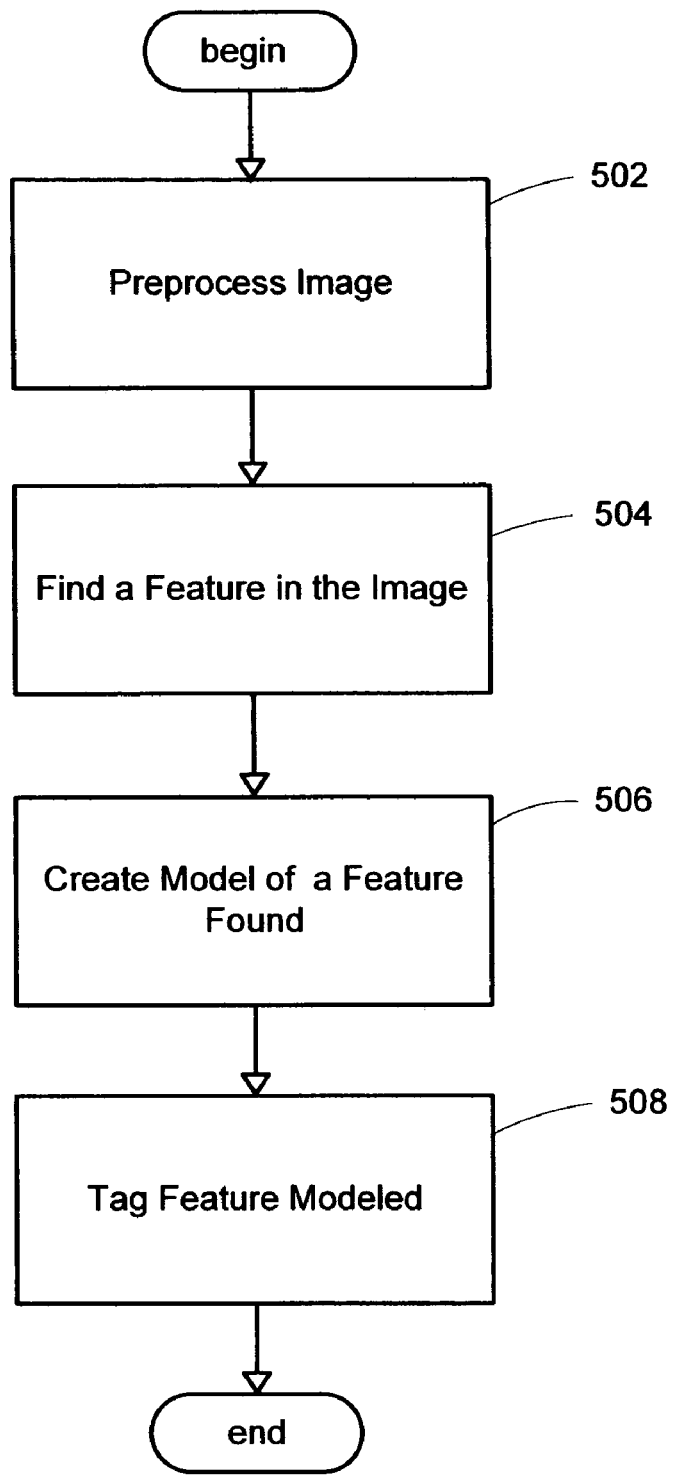
FIG. 5 is a flowchart generally representing one embodiment of the steps undertaken for modeling graphical components in an image, in accordance with an aspect of the present invention.

FIG. 5 presents a flowchart generally representing one embodiment of the steps undertaken for modeling graphical components in an image. At step 502 an image may be preprocessed by applying one or more filters to the image. A filter may be chosen, for example, to suppress high frequencies in the images or to enhance low frequencies in the images. Any filters known to those skilled in the art may be used including without limitation an identity filter, a geometric filter, an entropy filter, a median filter, a convolution filter including a blur filter, a Gaussian filter, a sharpen filter, a Laplacian filter and other filters which may be applied to the image. In general, preprocessing may filter non-meaningful image variations, such as a slight variation in the channels or a position offset in the rendering, from an image. In an alternative embodiment, an image may be preprocessed by applying one or more transforms to the image. Any type of geometrical transform, such as using a 2D affine transform, may be applied including translation, rotation, and scaling. In one embodiment, a transform may only be applied to the target image. Upon performing any preprocessing and applying any filters and transforms, a feature may be found in the image as further described below in conjunction with FIG. 6.

After preprocessing an image, a feature forming a graphical component may be found in the image at step 504. In general, the process of finding a feature may provide a collection of matrices identifying the shape of the graphical component by projecting them on a unique point of a multidimensional feature space. Further details for finding a feature in an image are described in more detail below in conjunction with FIG. 6. Once a feature may be found, then a model of the feature may be created at step 506. For instance, a model such as model 302 in FIG. 3 may be created for the feature. A node in the model may include a collection of matrices identifying the shape, the width of the shape, a bounding box surrounding the shape, and other information identifying the feature. Finally at step 508, the node in the model may be tagged and assigned a unique name for inclusion of the modeled feature in a model.

Figure 6:
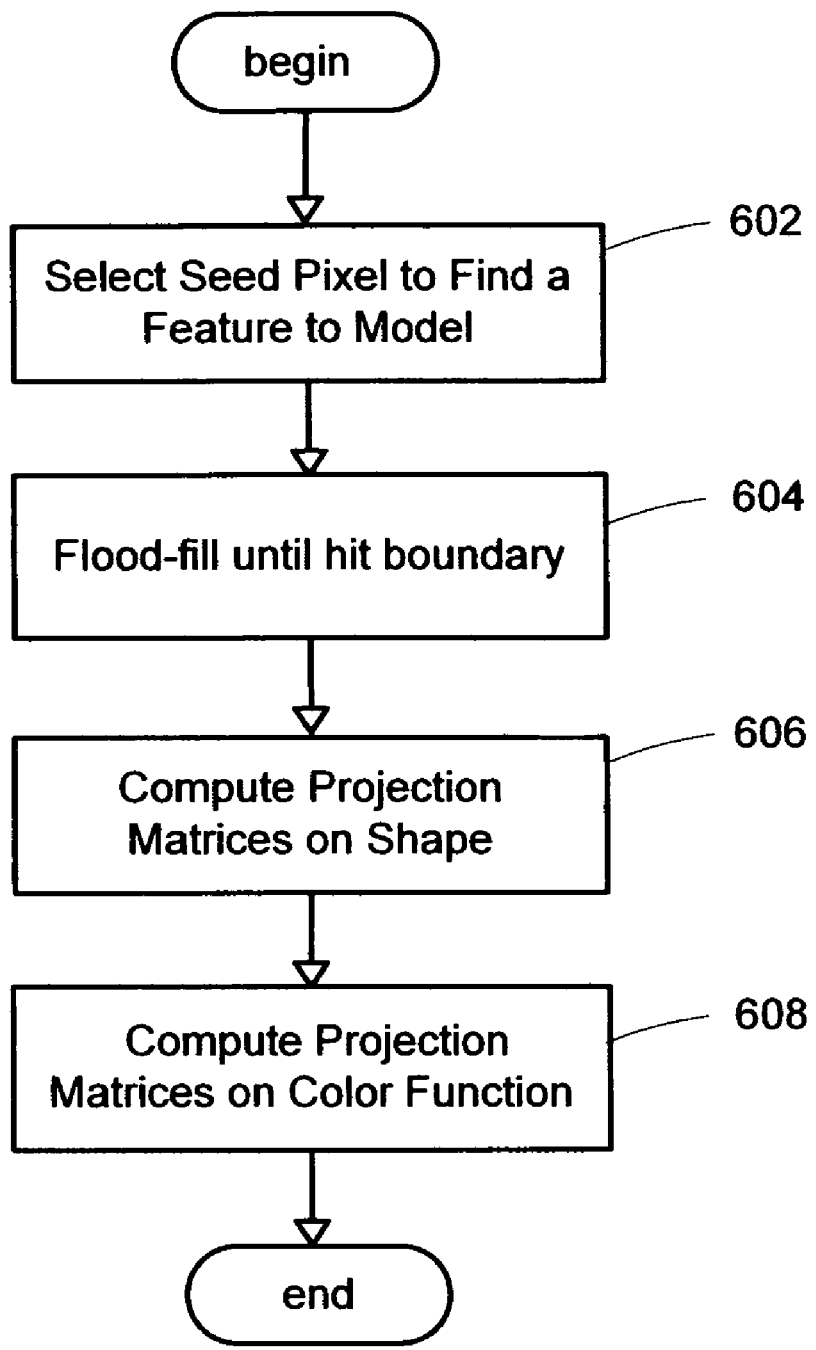
FIG. 6 is a flowchart generally representing one embodiment of the steps undertaken for finding a feature forming a graphical component in an image, in accordance with an aspect of the present invention.

FIG. 6 presents a flowchart generally representing one embodiment of the steps undertaken for finding a feature forming a graphical component in an image. At step 602 a pixel may be chosen as a seed for aggregating similar pixels in a neighborhood to identify a graphical component in an image. At step 604, adjacent pixels that are similar to a selected seed may be flood-filled until reaching pixels that are dissimilar and may form a boundary surrounding the neighborhood of similar pixels. In one embodiment, pixels may be considered to be similar if the sum of the absolute difference of the channels may be less than an assigned threshold.

Once an area of the image may be flood-filled for identifying a shape, then feature matrices based on specialized integrals such as Zernike moments, Fourier transform, Wavelets, and so forth, may be computed on the shape at step 606 for describing the shape. Next, feature matrices based on the color function supported by the shape such as the color of the pixels that may make the shape itself, may be computed on the shape at step 608. Thus, the modeled feature may be described as a collection of matrices identifying the shape of the graphical component by projecting them on a unique point of a multidimensional feature space. As a result, each feature may be described by two matrices or, more generally, a collection of matrices. Those skilled in the art will appreciate that additional matrices or computations may be made and associated with the feature that may describe the shape.

Figure 7:
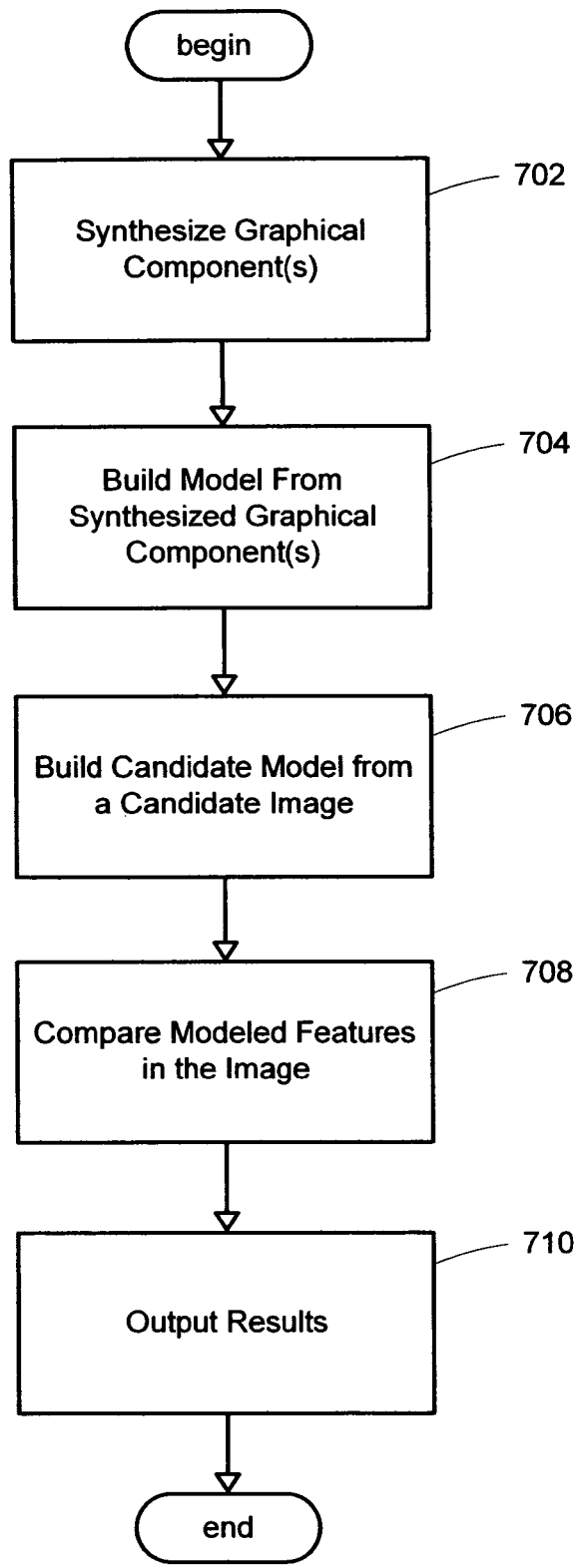
FIG. 7 is a flowchart generally representing one embodiment of the steps undertaken for building a model of one or more synthesized graphical components for validating the content of one or more test images.

In addition to validating an image by building a model of graphical components of an image to be compared with a model of graphical components of another image, a model may be built from one or more synthesized graphical components for validation the content of one or more target images. FIG. 7 presents a flowchart generally representing one embodiment of the steps undertaken for building a model of one or more synthesized graphical components for validating the content of one or more test images. In this embodiment, the topology of the model may be used to validate content in candidate test images. For example, the text of a button such as "OK" may be validated. At step 702 one or more graphical components may be synthesized. A design tool that may provide glyphs of basic graphical components such as buttons, menus, listboxes and other graphical components may aid in the creation of a graphical component. After one or more graphical components are synthesized, a model may be built from the synthesized graphical components at step 704. For example, a model such as model 302 in FIG. 3 may be created from a feature found in the graphical component. Once a model is built from the synthesized graphical components, a model of graphical components may be built from a candidate image at step 706. The model may be built following the process described in conjunction with FIG. 5 and FIG. 6. Namely, the image may be preprocessed, features may be found in the image, and a model may be created of the features found in the image. Next the modeled features of the synthesized graphical components and the candidate image may be compared at step 708. To do so, the process described below in conjunction with FIG. 8 may be used in one embodiment. Finally, at step 710, results may be output. For example, an indication may be output that the modeled features may be determined to be comparable; otherwise, an indication may be output that the modeled features may be determined to have failed to be comparable.

Figure 8:
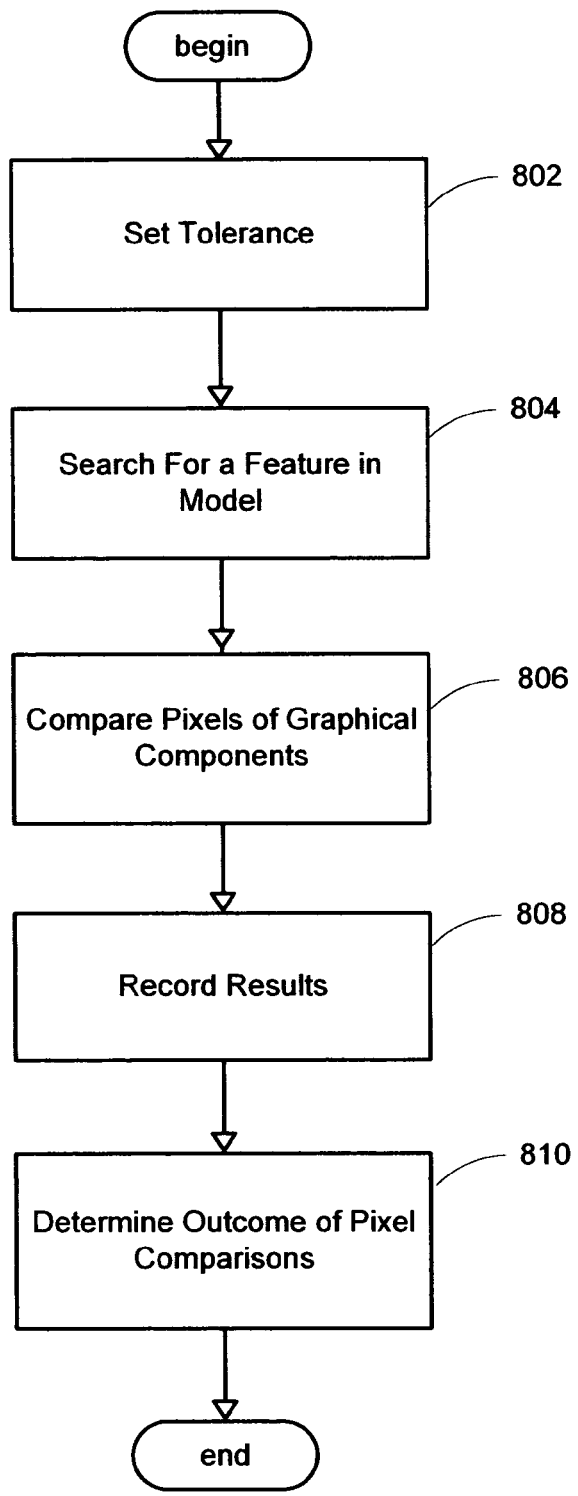
FIG. 8 is a flowchart generally representing one embodiment of the steps undertaken for comparing a model of one or more graphical components with another model of one or more graphical components.

FIG. 8 presents a flowchart generally representing one embodiment of the steps undertaken for comparing a model of one or more graphical components with another model of one or more graphical components. At step 802, a tolerance may be set for use in comparing the models of graphical components. In one embodiment, the tolerance may be set by selecting one of a set of predefined tolerance levels. Each tolerance level may represent a different degree of tolerance to be used in comparison of the images. For example, a set of tolerance levels may be created such as very fuzzy, tolerant, strict and very strict. This may be particularly useful for processing different types of images such as content images, a series of graphical user interface screens, visual primitives, and so forth. A user may select one of the levels of tolerance to be used in the comparison of image. Alternatively, one of the tolerance levels may be selected automatically based upon the type of an image, such as a content image. In another embodiment, the system may be initialized to a default tolerance level. In general, a tolerance level as used herein means a set of mathematical representations including numbers, equations, graphs, and so forth.

In one embodiment, the set of tolerance levels may be a set of tolerance curves that may be compared to an error histogram formed by comparing corresponding pixels of the images. Furthermore, the tolerance curves may be modulated as a function of a user or time by scaling the tolerance curves to accommodate external variables. Those skilled in the art will appreciate that the tolerance curves may be modulated by other functions.

After the tolerance has been set for use in comparing images at step 802, the process may next search for one or more features in the model of an image at step 804 by comparing the descriptors of the features in the model with the descriptors of features in a model of candidate image. The pixels of a graphical component of the model of synthesized components may then be compared with the pixels of a graphical component of the model of the candidate image at step 806. To do so, a pixel of one graphical component may be compared to a corresponding pixel in another graphical component. In one embodiment, a corresponding pixel may be a pixel with the same relative location within the graphical component. To compare corresponding pixels, the distance between the colors of corresponding pixels may be measured as the sum of the absolute difference between the R, G, B and alpha channels. Other measures of difference, such as the sum of the differences in the channels, may be used in another embodiment. The results of pixel comparisons may then be recorded at step 808.

In one embodiment, the results of pixel comparisons may be recorded in an error histogram. The error histogram may be a 1 to n dimensional array representing a count of a particular percentage of error resulting from comparing pixels. If there is a difference measured between compared pixels of the images, then the difference may be recorded in the histogram by incrementing the column corresponding to that absolute difference. For example, we may construct a histogram of values that range from 100% to a maximum error value. After the difference is measured for each pixel comparison, the count may be incremented in the appropriate column of the histogram for that percent of error measured. If the values are the same, then the difference may be zero and one may be added to the 100% column of the histogram. If the percent of error measured exceeds the maximum error value, then the count for the maximum error value may be incremented. In an alternate embodiment, all channels and errors may be normalized to 1 in order to accommodate different pixel representation schemas. For each value of the error which may range between a minimum of 0 and a maximum of 1, the value may be stored into the error histogram. The resulting histogram may then be normalized by the number of pixels so that dimensions of the images do not affect the comparison.

When every pixel has been compared and the result from measuring the difference is added to the appropriate column of the histogram, the columns of the histogram will have plotted the differences measured between the images. In one embodiment, the process of comparing pixels may terminate if any histogram column grows to exceed a bound such as the set tolerance level or other predefined value. At step 810, the recorded results may be used to determine the outcome of the pixel comparisons. In one embodiment, a tolerance curve may be compared to the columns of the histogram that represent the differences measured between the pixels of the images. If none of the columns exceed the value of the tolerance curve, the images may be determined to be comparable; otherwise, the images may be determined to have failed to be comparable.

Thus the system and method may provide a framework that allows flexible resolution in comparing models of graphical components of images. The invention may also provide a framework for building a model of a synthesized graphical component that contains only pertinent information to be compared with a graphical component of another image. Advantageously, the model of a synthesized graphical component may also be compared against a set of candidate images to find an image with an equivalent graphical component as that defined by the model of a synthesized graphical component. This may allow the present invention to selectively find a defect when validating images in a software build and may also enable content in the images to be validated by the topology of the model of the synthesized graphical component.

As can be seen from the foregoing detailed description, there is provided a system and method for validating graphical components of images. The system and method may accept any image, including any visual primitive used in a graphical user interface, and perform validation of the image using a source image or a reference model. Moreover, the present invention offers flexible matching and resolution control for validating any number of different image types and may target specific content for validation within one or more images. The system and method thus provide significant advantages and benefits needed in contemporary software development and testing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for validating graphical components of images, comprising:
a processor;
and system memory that stores the following:
an image validation engine, including:
a modeling engine coupled to the image validation engine for creating a first model of graphical components from a source image and a second model of graphical components from a target image,
wherein the modeling engine creates the first model of graphical components from the source imager and the second model of graphical components from the target image by performing the following steps for each of the target and source image:
preprocessing a corresponding image that corresponds to said each of the target image and the source image by applying one or more filters to the corresponding image;
finding a feature forming a graphical component in the corresponding image by performing the following steps:
selecting a pixel as a seed for aggregating similar pixels in an area to identify the graphical component in the corresponding image;
flood-filling adjacent pixels that are similar to the seed pixel to generate the area of similar pixels; computing one or more matrices for describing the shape of the area based on one or more integrals; and
computing one or more matrices for describing the color of the area;
creating a model of the feature having a node which includes the one or more matrices for describing the shape and color of the area; and
tagging a-the node in the model with a unique name; and
an image comparator coupled to the image validation engine for comparing the first model of graphical components from the source image with the second model of graphical components from the target image, wherein comparing the first model of graphical components from the source image with the second model of graphical components from the target image comprises:
searching for one or more features in the second model of graphical components from the target image by comparing the one or more matrices which describe the shape and color of the area of each feature of the second model of graphical components from the target image with the one or more matrices which describe the shape and color of the area of a feature of the first model of graphical components from the source image; and
upon detecting that the second model of graphical components from the target image contains a feature that matches a feature of the first model of graphical components from the source image, comparing the features.

2. The system of claim 1 wherein the system memory further stores a media library coupled to the image validation engine for capturing events in the system.

3. The system of claim 1 wherein the system memory further stores a user interface coupled to the image validation engine for exposing model designers and analysis tools.

4. The system of claim 1 wherein the system memory further stores a loader coupled to the image validation engine for providing components that may each include information for a specific test.

5. A method for validating graphical components of images in a computer system, comprising one or more processors implementing:
creating a first model of graphical components from a source image, wherein creating the first graphical components from the source image comprises:
preprocessing the source image by applying one or more filters to the source image; finding a feature forming a graphical component in the source image by performing the following steps:
selecting a pixel as a seed for aggregating similar pixels in an area to identify the graphical component in the source image;
flood-filling adjacent pixels that are similar to the seed pixel to generate the area of similar pixels;
computing one or more matrices for describing the shape of the area based on one or more integrals; and
computing one or more matrices for describing the color of the area; creating a model of the feature having a node which includes the one or more matrices for describing the shape and color of the area; and
tagging a node in the model with a unique name;
creating a second model of graphical components in a target image, wherein creating the second model of graphical components from the target image comprises:
preprocessing the target image by applying one or more filters to the target image; finding a feature forming a graphical component in the target image by performing the following steps:
selecting a pixel as a seed for aggregating similar pixels in an area to identify the graphical component in the target image;
flood-filling adjacent pixels that are similar to the seed pixel to generate the area of similar pixels;
computing one or more matrices for describing the shape of the area based on one or more integrals; and
computing one or more matrices for describing the color of the area; and
creating a model of the feature which includes the one or more matrices for describing the shape and color of the area;
comparing the first model of graphical components from the source image with the second model of graphical components from the target image to determine if the source image and the target image are comparable, wherein comparing the first model of graphical components from the source image with the second model of graphical components from the target image comprises:
searching for one or more features in the second model of graphical components from the target image by comparing the one or more matrices which describe the shape and color of the area of each feature of the second model of graphical components from the target image with the one or more matrices which describe the shape and color of the area of a feature of the first model graphical components from the source image; and
upon detecting that the second model of graphical components from the target image contains a feature that matches a feature of the first model of graphical components from the source image, comparing the features; and outputting results from the comparison of the first model of graphical components from the source image and second model of graphical components from the target image.

6. The method of claim 5 wherein filtering the source image comprises suppressing high frequencies in the image.

7. The method of claim 5 wherein filtering the source image comprises enhancing low frequencies in the image.

8. The method of claim 5 wherein preprocessing the source image comprises performing a geometrical transform on the image.

9. The method of claim 8 wherein performing a geometrical transform comprises performing a 2D affine transform.

10. The method of claim 5 wherein creating the first model graphical components from the source image comprises creating a tree with one or more child nodes, each node aggregating primitives detected within the source image.

11. The method of claim 5 wherein comparing the first model graphical components from the source image with the second model of graphical components from the target image to determine if the source image and the target image are comparable comprises setting an adjustable tolerance level for comparing the graphical components in the source image and graphical components in the target image.

12. The method of claim 11 wherein setting an adjustable tolerance level for comparing the graphical components in the source image and graphical components in the target image comprises selecting one of a set of predefined tolerance levels.

13. The method of claim 12 wherein selecting one of a set of predefined tolerance levels comprises selecting one of a set of predefined tolerance curves.

14. The method of claim 5 wherein comparing the first model of graphical components from the source image with the second model of graphical components from the target image to determine if the source image and the target image are comparable comprises comparing pixels of the graphical components in the source image with corresponding pixels of the graphical components in the target image to detect differences between the pixels compared.

15. The method of claim 14 wherein comparing pixels of the graphical components in the source image with corresponding pixels of the graphical components in the target image to detect differences between the pixels compared comprises measuring the distance between the colors of the pixels as the sum of the absolute difference between the R, G, B and alpha channels.

16. The method of claim 14 wherein comparing pixels of the graphical components in the source image with corresponding pixels of the graphical components in the target image to detect differences between the pixels compared comprises recording the result of the differences between pixels.

17. The method of claim 16 wherein recording the result of the differences between pixels comprises recording the result of the differences between pixels in a histogram.

18. A computer storage medium having stored computer-executable instructions for performing the method of claim 5.

19. The method of claim 5 wherein creating the first model of graphical components in a source image comprises creating a tree with one or more child nodes, each node aggregating primitives detected within the first graphical component.

20. The method of claim 10, further comprising assigning a unique name to a node of the tree which identifies the graphical component.

* * * * *